United States Patent
Mukherjee et al.

(10) Patent No.: US 9,687,804 B2
(45) Date of Patent: Jun. 27, 2017

(54) CONVERSION OF ASPHALTENIC PITCH WITHIN AN EBULLATED BED RESIDUUM HYDROCRACKING PROCESS

(71) Applicant: Lummus Technology Inc., Bloomfield, NJ (US)

(72) Inventors: Ujjal K. Mukherjee, Montclair, NJ (US); Mario C. Baldassari, Morris Plains, NJ (US); Marvin I. Greene, Clifton, NJ (US)

(73) Assignee: Lummus Technology Inc., Bloomfield, NJ (US)

( * ) Notice: Subject to any disclaimer, the term of this patent is extended or adjusted under 35 U.S.C. 154(b) by 191 days.

(21) Appl. No.: 14/685,798

(22) Filed: Apr. 14, 2015

(65) Prior Publication Data
US 2015/0217251 A1      Aug. 6, 2015

Related U.S. Application Data

(62) Division of application No. 13/743,936, filed on Jan. 17, 2013, now Pat. No. 9,028,674.

(51) Int. Cl.
*B01J 8/00* (2006.01)
*B01J 8/08* (2006.01)
(Continued)

(52) U.S. Cl.
CPC ............. *B01J 8/18* (2013.01); *B01J 19/245* (2013.01); *C10G 1/08* (2013.01); *C10G 1/086* (2013.01);
(Continued)

(58) Field of Classification Search
CPC ......... B01J 8/00; B01J 8/02; B01J 8/18; B01J 19/00; B01J 19/24; B01J 19/245;
(Continued)

(56) References Cited

U.S. PATENT DOCUMENTS 3,814,681 A    6/1974   McKinney
3,888,761 A    6/1975   Stewart
(Continued)

OTHER PUBLICATIONS

International Search Report and Written Opinion issued Apr. 2014 in corresponding International application No. PCT/US2014/011022 (13 pages).
(Continued)

*Primary Examiner* — Natasha Young
(74) *Attorney, Agent, or Firm* — Osha Liang LLP (57) ABSTRACT

A process for upgrading residuum hydrocarbons including: feeding pitch, hydrogen, and a partially spent catalyst recovered from a hydrocracking reactor to an ebullated bed pitch hydrocracking reactor; contacting the pitch, hydrogen, and the catalyst in the ebullated bed pitch hydrocracking reactor at reaction conditions of temperature and pressure sufficient to convert at least a portion of the pitch to distillate hydrocarbons; and separating the distillate hydrocarbons from the catalyst. In some embodiments, the process may include selecting the ebullated bed pitch hydrocracking reactor reaction conditions to be at or below the level where sediment formation would otherwise become excessive and prevent continuity of operations.

22 Claims, 3 Drawing Sheets

(51) Int. Cl.

| | | |
|---|---|---|
| *B01J 8/18* | (2006.01) | |
| *B01J 19/00* | (2006.01) | |
| *B01J 19/24* | (2006.01) | |
| *C10G 47/00* | (2006.01) | |
| *C10G 47/24* | (2006.01) | |
| *C10G 47/26* | (2006.01) | |
| *C10G 65/00* | (2006.01) | |
| *C10G 65/02* | (2006.01) | |
| *C10G 65/10* | (2006.01) | |
| *C10G 65/12* | (2006.01) | |
| *C10G 1/08* | (2006.01) | |
| *C10G 67/02* | (2006.01) | |

(52) U.S. Cl.
CPC .............. *C10G 47/26* (2013.01); *C10G 65/10* (2013.01); *C10G 65/12* (2013.01); *C10G 67/02* (2013.01); *B01J 2208/00796* (2013.01); *B01J 2219/24* (2013.01); *C10G 2300/701* (2013.01)

(58) Field of Classification Search
CPC .............. B01J 2208/00796–2208/00814; B01J 2219/24; C10G 1/00; C10G 1/08; C10G 1/086; C10G 47/00; C10G 47/24; C10G 47/26; C10G 65/00; C10G 65/02; C10G 65/10; C10G 65/12; C10G 67/00; C10G 67/02; C10G 2300/00; C10G 2300/70; C10G 2300/701; C10G 1/0608
See application file for complete search history.

(56) References Cited

U.S. PATENT DOCUMENTS

| | | |
|---|---|---|
| 4,101,416 A | 7/1978 | Dolbear |
| 4,176,048 A | 11/1979 | Corns et al. |
| 4,432,953 A | 2/1984 | Hubred et al. |
| 4,434,141 A | 2/1984 | Hubred et al. |
| 4,435,280 A | 3/1984 | Ranganathan et al. |
| 4,442,074 A | 4/1984 | Hubred et al. |
| 4,500,495 A | 2/1985 | Hubred et al. |
| 4,514,368 A | 4/1985 | Hubred |
| 4,514,369 A | 4/1985 | Hubred et al. |
| 4,554,138 A | 11/1985 | Marcantonio |
| 4,761,220 A | 8/1988 | Beret et al. |
| 4,855,037 A | 8/1989 | Murakami et al. |
| 4,888,316 A | 12/1989 | Gardner et al. |
| 4,909,923 A | 3/1990 | Okazaki et al. |
| 4,927,794 A | 5/1990 | Marcantonio |
| 4,994,423 A | 2/1991 | Clark et al. |
| 4,997,799 A | 3/1991 | Clark et al. |
| 5,066,469 A | 11/1991 | Marcantonio |
| 5,071,538 A | 12/1991 | Clark et al. |
| 5,087,596 A | 2/1992 | Clark et al. |
| 5,283,217 A | 2/1994 | Ikura et al. |
| 5,360,535 A | 11/1994 | Liu et al. |
| 5,420,088 A | 5/1995 | Silva et al. |
| 5,466,363 A | 11/1995 | Audeh et al. |
| 5,755,955 A | 5/1998 | Benham et al. |
| 5,932,090 A | 8/1999 | Marchionna et al. |
| 6,004,453 A | 12/1999 | Benham et al. |
| 6,030,915 A | 2/2000 | de Boer |
| 6,127,299 A | 10/2000 | de Boer et al. |
| 6,270,654 B1 * | 8/2001 | Colyar .................. C10G 65/10 208/108 |
| 7,658,895 B2 | 2/2010 | Bhaduri |
| 7,696,120 B2 | 4/2010 | Ginestra et al. |
| 7,820,579 B2 | 10/2010 | Ginestra et al. |
| 7,906,447 B2 | 3/2011 | McCarthy et al. |
| 8,287,720 B2 | 10/2012 | Baldassari et al. |
| 2006/0054533 A1 | 3/2006 | Chen et al. |
| 2007/0108100 A1 * | 5/2007 | Satchell ............... C10G 21/003 208/86 |
| 2009/0261019 A1 | 10/2009 | McCarthy et al. |
| 2010/0105970 A1 * | 4/2010 | Yanik ..................... C10G 1/006 585/240 |
| 2010/0326882 A1 | 12/2010 | McGehee et al. |
| 2011/0015454 A1 | 1/2011 | Hanks |
| 2011/0155636 A1 | 6/2011 | Hanks et al. |
| 2011/0198265 A1 | 8/2011 | Colvar et al. |
| 2011/0210045 A1 | 9/2011 | Kou et al. |
| 2011/0226667 A1 | 9/2011 | Lott et al. |
| 2011/0303580 A1 | 12/2011 | Haizmann |
| 2012/0000821 A1 | 1/2012 | Yang et al. |
| 2012/0004091 A1 | 1/2012 | Kou et al. |
| 2012/0004097 A1 | 1/2012 | Yang et al. |

OTHER PUBLICATIONS

International Preliminary Report on Patentability issued Jul. 30, 2015 in corresponding International Application No. PCT/US2014/011022 (9 pages).

Notification of First Office Action issued Apr. 20, 2016 in corresonding Chinese application No. 201480014830.8 (w/ translation) (20 pages).

Extended European Search Report issued in corresponding European Application No. 14740475.0 dated Aug. 24, 2016 (7 pages).

Search Report of Written Opinion issued in corresponding Singaporean Application No. 11201505548X dated Aug. 3, 2016 (8 pages).

Office Action issued Oct. 27, 2016 in corresponding Russian application No. 2015134160/04(052489) (w/translation) (11 pages).

Office Action issued in corresponding Korean Application No. 10-2015-7021112 with English translation dated Jul. 7, 2016 (11 pages).

* cited by examiner

CONVERSION OF ASPHALTENIC PITCH WITHIN AN EBULLATED BED RESIDUUM HYDROCRACKING PROCESS

CROSS-REFERENCE TO RELATED APPLICATION

This application, pursuant to 35 U.S.C. §120, claims benefit to U.S. patent application Ser. No. 13/743,936 filed Jan. 17, 2013, now U.S. Pat. No. 9,028,674, which is incorporated by reference in its entirety.

FIELD OF THE DISCLOSURE

Embodiments disclosed herein relate generally to processes for upgrading petroleum feedstocks, such as asphaltenic pitch.

BACKGROUND

Hydrocracking processes can be used to upgrade higher boiling materials, such as residuum, typically present in heavy crude oil, by converting it into more valuable lower boiling materials. For example, at least a portion of the residuum feed to a hydrocracking reactor may be converted to a hydrocracking reaction product. The unreacted residuum may be recovered from the hydrocracking process and either removed or recycled back to the hydrocracking reactor in order to increase the overall residuum conversion.

The residuum conversion in a hydrocracking reactor can depend on a variety of factors, including feedstock composition; the type of reactor used; the reaction severity, including temperature and pressure conditions; reactor space velocity; and catalyst type and performance. In particular, the reaction severity may be used to increase the conversion. However, as the reaction severity increases, side reactions may occur inside the hydrocracking reactor to produce various byproducts in the form of coke precursors, sediments, other deposits, as well as byproducts, such as asphaltenic pitch.

One type of cracking reactor used in various processes includes an ebullated bed hydrocracking reactor. The addition of an intermediate or pre-deasphalting step to an ebullated bed process may enhance the performance of the ebullated bed process, such as by increased conversion and production of residual oils with high stability. However, there is inevitably a volume of pitch that needs to be disposed of. The pitch, if it is to be converted to fuel oil, requires a very high volume of a lighter cutter stock, such as light cycle oil from an FCC unit. The pitch can alternatively be fed to a Delayed Coking unit, but pitch is not a very desirable feedstock. The pitch could also be converted to asphalt, but demand can be seasonal and the quality of pitch may not meet local specifications. The pitch could be gasified, but costs are generally prohibitive. Pitch is therefore not a desired byproduct.

SUMMARY OF THE CLAIMED EMBODIMENTS

In one aspect, embodiments disclosed herein relate to a process for upgrading residuum hydrocarbons. The process may include: feeding pitch, hydrogen, and a partially spent catalyst recovered from a hydrocracking reactor to an ebullated bed pitch hydrocracking reactor; contacting the pitch, hydrogen, and the catalyst in the ebullated bed pitch hydrocracking reactor at reaction conditions of temperature and pressure sufficient to convert at least a portion of the pitch to distillate hydrocarbons; and separating the distillate hydrocarbons from the catalyst. In some embodiments, the process may include selecting the ebullated bed pitch hydrocracking reactor reaction conditions to be at or below the level where sediment formation would otherwise become excessive and prevent continuity of operations.

In another aspect, embodiments disclosed herein relate to a process for upgrading residuum hydrocarbons. The process may include: feeding pitch, hydrogen, and a spent or partially spent catalyst recovered from a hydrocracking reactor to a pitch hydrocracking reactor; contacting the pitch, hydrogen, and the catalyst in the pitch hydrocracking reactor at reaction conditions of temperature and pressure sufficient to convert at least a portion of the pitch to distillate hydrocarbons; separating the distillate hydrocarbons from the catalyst.

In another aspect, embodiments disclosed herein relate to a system for upgrading residuum hydrocarbons. The system may include: a residuum hydrocarbon conversion reactor system for contacting a residuum hydrocarbon, hydrogen, and a hydrocracking catalyst to convert at least a portion of the residuum hydrocarbon to distillate range hydrocarbons; a separation system for fractionating the distillate range hydrocarbons into two or more hydrocarbon fractions including a vacuum tower bottoms fraction; a separation system for recovering at least some of the spent catalyst from the residuum hydrocarbon conversion reactor system; a solvent deasphalting unit for solvent deasphalting the vacuum tower bottoms fraction to produce a deasphalted oil fraction and a pitch fraction; and a pitch hydrocracking reactor system for contacting the pitch, hydrogen, and spent catalyst recovered from the residuum hydrocarbon reactor system at reaction conditions of temperature and pressure sufficient to convert at least a portion of the pitch to distillate hydrocarbons.

Other aspects and advantages will be apparent from the following description and the appended claims.

DETAILED DESCRIPTION

In one aspect, embodiments herein relate generally to hydroconversion processes, including processes for hydrocracking residuum and other heavy hydrocarbon fractions. More specifically, embodiments disclosed herein relate to processes for upgrading asphaltenic pitch via hydrocracking in an ebullated bed hydrocracking reactor using a spent or partially spent catalyst recovered from a hydrocracking reactor system.

As used herein, "residuum hydrocarbons," "heavy oils," or other terms referring to residuum hydrocarbons, refers to hydrocarbon fractions having boiling points or a boiling range above about 340° C., but could also include whole heavy crude processing. Residuum hydrocarbon feedstocks that may be used with processes disclosed herein may include various refinery and other hydrocarbon streams such as petroleum atmospheric or vacuum residuum, deasphalted oil, deasphalter pitch, hydrocracked atmospheric tower or vacuum tower bottoms, straight run vacuum gas oil, hydrocracked vacuum gas oil, fluid catalytically cracked (FCC) slurry oils, vacuum gas oil from an ebullated bed process, shale oils, coal-derived oils, tar sands bitumen, tall oils, black oils, as well as other similar hydrocarbon streams, or a combination of these, each of which may be straight run, process derived, hydrocracked, partially desulfurized, and/or low-metal streams. In some embodiments, residuum hydrocarbon fractions may include hydrocarbons having a normal boiling point of at least 480° C., at least 524° C., or at least 565° C.

The residuum hydrocarbons described above may be hydrocracked in a hydrocracking reaction system having one or more reaction stages including one or more hydrocracking reactors. For example, a hydrocracking reaction system may include a single reaction stage having a single hydrocracking reactor, such as an ebullated bed hydrocracking reactor or a fluidized bed hydrocracking reactor. As another example, a hydrocracking reaction system may include two reaction stages, each including one or more hydrocracking reactors. The first and second hydrocracking reaction stages may be used to sequentially perform one or more of metals removal, denitrogenation, desulfurization, hydrogenation, Conradson Carbon Residue reduction, and/or other hydroconversion reactions in addition to hydrocracking to otherwise convert the residuum to useful products. The reactivity for the varied reactions noted may be provided by a single hydrocracking catalyst or multiple hydrocracking catalysts. In some embodiments having two or more reaction stages, each reaction stage includes an ebullated bed hydrocracking reactor.

Following hydrocracking, the effluent from the hydrocracking reactor(s) may be fractionated to recover one or more hydrocarbon fractions, such as a light naphtha fraction, a heavy naphtha fraction, a kerosene fraction, a diesel fraction, a light vacuum gas oil fraction, a heavy gas oil fraction, and a vacuum resid fraction, among other possible fractions. The heavier of these fractions, such as the vacuum resid fraction, may be processed through a solvent deasphalting (SDA) unit to produce a deasphalted oil fraction and a pitch fraction.

Pitch is defined herein as a vacuum residuum stream recovered from thermal, thermal-catalytic or catalytic hydrocracking processes fed with high boiling hydrocarbonaceous materials such as petroleum atmospheric or vacuum residuum, shale oils, coal-derived oils, tar sands bitumen, tall oils, black oils, bio-derived crude oils as well as other similar hydrocarbonaceous streams, or a combination of these, each of which may be straight run.

The pitch, hydrogen, and partially spent catalyst recovered from the hydrocracking reactors may be fed to a pitch hydrocracking reactor, such as an ebullated bed pitch hydrocracking reactor, for upgrading of the pitch to more valuable hydrocarbons. The residuum hydrocarbon hydrocracking reaction system, such as one including ebullated bed hydrocracking reactor(s), may generate a quantity of spent or partially spent catalyst. This "spent catalyst," although containing nickel and vanadium removed during cracking in the ebullated bed hydrocracking reactors, may still possess substantial residual hydrocracking activity, although the level of activity may not be suitable or desirable for continued use in the ebullated bed hydrocracking reactor(s). The spent catalyst is normally sent to a metals reclaimer to reclaim some of the metals contained in the catalyst. However, embodiments herein utilize the residual activity to convert the pitch to distillate range hydrocarbons. The fully spent catalyst recovered from the pitch hydrocracking reactor may then be sent to a metals reclaimer for reclamation of the metals contained in the catalyst.

As described above, processes herein may utilize "spent" and "partially spent" catalyst. As used herein, partially spent catalyst may refer, for example, to catalyst purged from an ebullated bed unit that is fed with fresh catalyst. Spent catalyst may refer, for example, to catalyst recovered from an ebullated bed unit that is fed with partially spent catalyst, and having essentially no activity. An intermediate spent catalyst may refer, for example, to catalyst recovered from an ebullated bed unit that is fed with a blend of spent and partially spent catalyst, which may have an activity greater than a fully spent catalyst but lower than that of a partially spent catalyst; the term "partially spent" catalyst is intended to include "intermediate spent" catalysts herein. The level of the net activity of the fresh catalyst, partially spent catalyst, or intermediate spent catalyst may impact the reaction severity required in the hydrocracking reactors needed to achieve the targeted conversions, where such operating conditions should be maintained at or below the point of critical sediment formation.

The hydrocarbon effluent from the pitch hydrocracking reactor may be fractionated into two or more hydrocarbon fractions, including a vacuum tower bottoms fraction (i.e., unreacted pitch). The vacuum tower bottoms fraction may be recycled for further processing in the pitch hydrocracking reactor. In some embodiments, recycle of the vacuum tower bottoms fraction may result in cracking of the pitch at high conversion rates, and possibly to extinction, resulting in an overall integrated residuum hydrocracking process scheme producing little or no pitch as an unwanted or low-value product.

Figure 1:
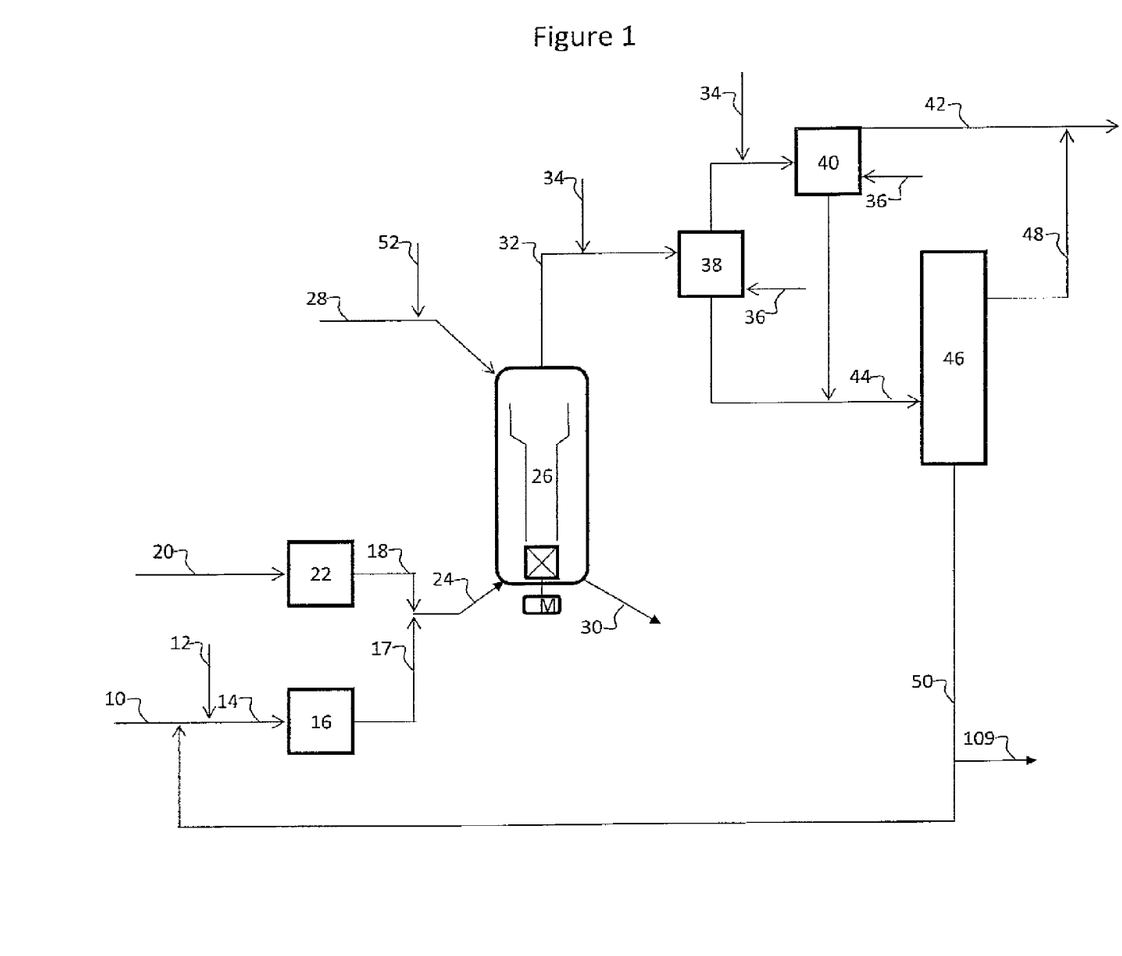
FIGS. 1-3 are simplified process flow diagrams of processes for upgrading hydrocarbon feedstocks according to embodiments disclosed herein.

Referring now to FIG. 1, a simplified flow diagram of a process for upgrading pitch according to embodiments herein is illustrated. Pitch 10, such as a pitch fraction recovered from a DAO unit, may be mixed with a hydrocarbon fraction 12, such as a slurry oil, decant oil, or cycle oil from an FCC unit. The addition of hydrocarbon fraction 12 may be beneficial, but is not essential. The resulting feed blend 14 may be heated, such as via an indirect heat exchange in heater 16. Heated feed blend 17 may be mixed with a heated hydrogen-rich stream 18 (such as a stream resulting from heating of a hydrogen-rich feed stream 20 via heater 22) to form a mixed feed stream 24.

Mixed feed stream 24 may then be fed to a pitch hydrocracking unit including one or more ebullated bed pitch hydrocracking reactors 26, where it is contacted with a partially spent hydrocracking catalyst 28 under reaction conditions sufficient to convert at least a portion of the pitch to distillate hydrocarbons. Reaction conditions in ebullated bed pitch hydrocracking reactor may include: (a) a hydrogen partial pressure of greater than about 50 bar in some embodiments, or greater than about 70 bar in other embodiments; (b) a temperature greater than about 350° C. in some embodiments, and greater than about 380° C. in other embodiments; and (c) a liquid hourly space velocity (LHSV) greater than about 0.05 $h^{-1}$ in some embodiments, and greater than about 0.1 $h^{-1}$ in other embodiments. In some embodiments the hydrogen partial pressure may be in the range from about 70 bar to about 170 bar, the temperature may be in the range from about 380° C. to about 450° C., and the LHSV may be in the range from about 0.1 $h^{-1}$ to about 1.0 $h^{-1}$. Temperatures in the ebullated bed pitch hydrocracking reactor may be selected to achieve pitch conversions at or below the level where sediment formation would otherwise become excessive and thereby prevent continuity of operations, which may vary depending upon the composition of the pitch feed. Target residuum conversion levels in the pitch hydrocracking unit may be at least 10 wt %, such as in the range from about 20 wt % to about 95 wt %, depending upon the feedstock being processed. In some embodiments, target residuum conversions in the pitch hydrocracking unit may be in the range from about 30 wt %, 40 wt %, or 50 wt % to about 70 wt %, 75 wt %, or 80 wt %.

Within the ebullated bed reactor 26, the catalyst is back-mixed and maintained in random motion by the recirculation of liquid product. This is accomplished by first separating the recirculated oil from the gaseous products. The oil is then recirculated by means of an external pump or a pump having an impeller mounted in the bottom head of the reactor. The spent catalyst feed 28 may be added to the top of ebullated bed pitch hydrocracking reactor 26, and fully spent hydrocracking catalyst may be withdrawn from the bottom of reactor 26 via flow line 30. The fully spent hydrocracking catalyst may then be sent to a metals reclaimer to reclaim metals contained in the spent catalysts or otherwise disposed of.

Liquid and vapor effluent from the ebullated bed pitch hydrocracking reactor 26 may be recovered via flow line 32 and quenched with an aromatic solvent 34 and/or a hydrogen-containing gas stream 36 and separated in high pressure high temperature (HP/HT) separator(s) 38 and wash unit 40 for separating any entrained solids from the vapors. Aromatic solvent 34 may include any aromatic solvent, such as slurry oil from a Fluid Catalytic Cracking (FCC) process or sour vacuum residuum, among others.

The separated vapor 42 from HP/HT separator(s) 38 and wash unit 40 may then be routed through a gas cooling, purification, and recycle gas compression system (not shown). For example, the separator vapor 42 may be co-processed with a vapor effluent recovered from the residuum hydrocarbon hydrocracking unit from which the spent catalyst feed is derived.

The separated liquids 44 recovered from the HP/HT separator 38 and wash unit 40, along with any entrained solids, may then be fed to a fractionation system 46 to separate distillate range hydrocarbons 48 from unreacted pitch 50. For example, the separated liquids 44 may be flashed and routed to an atmospheric distillation system (not shown) along with other distillate products recovered from the gas cooling and purification section (not shown). The atmospheric tower bottoms, such as hydrocarbons having an initial boiling point of at least about 340° C., such as an initial boiling point in the range from about 340° C. to about 427° C., may then be further processed through a vacuum distillation system (not shown) to recover vacuum distillates. One or more distillate products 48 may be recovered from fractionation system 46. The vacuum tower bottoms product 50, such as hydrocarbons having an initial boiling point of at least about 480° C., such as an initial boiling point in the range from about 480° C. to about 565° C., may then be filtered or separated to recover spent catalyst solids from the liquid, and the liquid may be routed back to the ebullated bed pitch hydrocracking reactor 26 for continued processing. A small slipstream 109 of recycle pitch stream 50 may be purged from the loop to maintain the material balance and continuity of flow.

To facilitate catalyst feed through flow line 28 to ebullated bed pitch hydrocracking reactor 26, the spent catalyst may be slurried with a hydrocarbon oil 52, such as a slurry oil or other hydrocarbons, including those produced by the hydrocracking or pitch hydrocracking systems. In some embodiments, the spent catalyst and/or cooled and solidified pitch feed and/or recycle pitch may also be fed to a grinder (not shown) and ground prior to slurrification and/or fed to ebullated bed pitch hydrocracking reactor 26. In such an embodiment, the catalyst may be fed to the bottom of ebullated bed pitch hydrocracking reactor.

Figure 2:
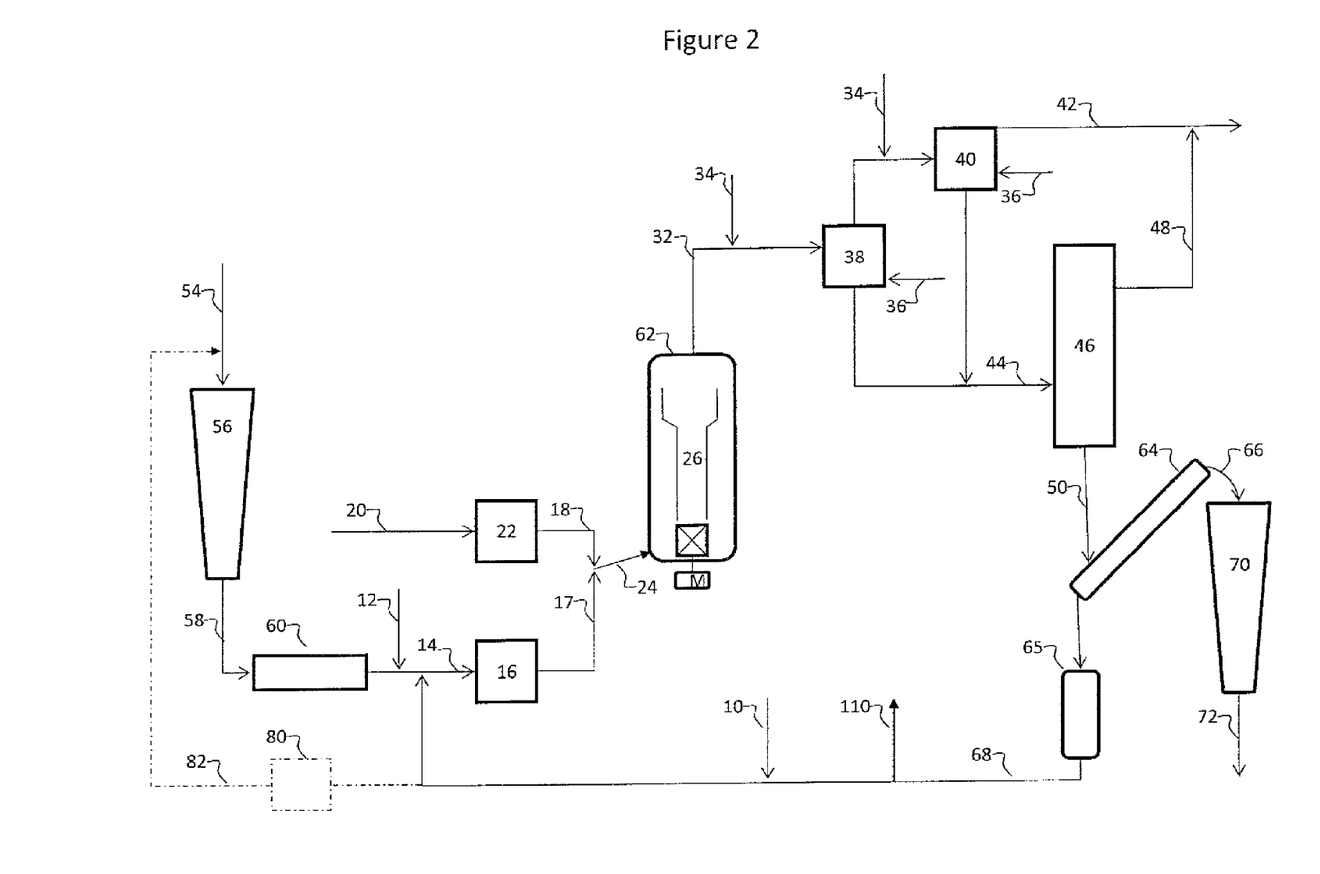

Referring now to FIG. 2, a simplified flow diagram of a process for upgrading pitch according to embodiments herein is illustrated, where like numerals represent like parts. A hydrocracking catalyst 54, such as a partially spent hydrocracking catalyst recovered from a residuum hydrocarbon hydrocracking system including one or more ebullated bed hydrocracking reactors, may be fed to a hopper 56 for temporary storage. The spent catalyst may then be fed via flow line 58 to a catalyst grinder 60. The ground (crushed) spent catalyst may then be combined with a hydrocarbon fraction 12 and pitch 10, such as a pitch fraction recovered from a SDA unit. The addition of hydrocarbon fraction 12, such as a slurry oil, decant oil, or cycle oil from an FCC unit, may be beneficial, but is not essential. The resulting feed blend 14 may be heated, such as via an indirect heat exchange in heater 16. Heated feed blend 17 may be mixed with a heated hydrogen-rich stream 18 (such as a stream resulting from heating of a hydrogen-rich feed stream 20 via heater 22) to form a mixed feed stream 24.

Mixed feed stream 24 may then be fed to a pitch hydrocracking unit including one or more pitch hydrocracking reactors 62, where the pitch and hydrogen are contacted with the ground partially spent hydrocracking catalyst under reaction conditions sufficient to convert at least a portion of the pitch to distillate hydrocarbons. Reaction conditions in pitch hydrocracking reactor 62 may include: (a) a hydrogen partial pressure of greater than about 50 bar in some embodiments, or greater than about 70 bar in other embodiments; (b) a temperature greater than about 350° C. in some embodiments, and greater than about 380° C. in other embodiments; and (c) a liquid hourly space velocity (LHSV) greater than about 0.05 $h^{-1}$ in some embodiments, and greater than about 0.1 $h^{-1}$ in other embodiments. In some embodiments the hydrogen partial pressure may be in the range from about 70 bar to about 170 bar, the temperature may be in the range from about 380° C. to about 450° C., and the LHSV may be in the range from about 0.1 $h^{-1}$ to about 1.0 $h^{-1}$. Temperatures in the pitch hydrocracking reactor may be selected to achieve pitch conversions at or below the level where sediment formation would otherwise become excessive and thereby prevent continuity of operations, which may vary depending upon the composition of the pitch feed. Target residuum conversion in the pitch hydrocracking unit may be at least 10 wt %, such as in the range from about 20 wt % to about 95 wt %, depending upon the feedstock being processed. In some embodiments, target residuum conversions in the pitch hydrocracking unit may be in the range from about 30 wt % to about 75 wt %.

Pitch hydrocracking reactor 62 may be a single pass upflow reactor, where the catalyst is recovered with the hydrocracked product or it may be an ebullated bed reactor wherein the catalyst is back-mixed and maintained in random motion by the recirculation of the liquid product. The liquid and vapor effluent from the pitch hydrocracking reactor 62 may be recovered via flow line 32 and quenched with an aromatic solvent 34 and/or a hydrogen-containing gas stream 36 and separated in high pressure high temperature (HP/HT) separator(s) 38 and a wash unit 40 for separating any entrained solids from the vapors. Aromatic solvent 34 may include any aromatic solvent, such as slurry oil from a Fluid Catalytic Cracking (FCC) process or sour vacuum residuum, among others.

The separated vapor 42 from HP/HT separator(s) 38 and wash unit 40 may then be routed through a gas cooling, purification, and recycle gas compression system (not shown). For example, the separator vapor 42 may be co-processed with a vapor effluent recovered from the residuum hydrocarbon hydrocracking unit from which the spent catalyst feed is derived.

The separated liquids 44 recovered from the HP/HT separator 38 and wash unit 40, along with spent catalyst solids, may then be fed to a fractionation system 46 to separate distillate range hydrocarbons 48 from unreacted pitch 50. For example, the separated liquids 44 may be flashed and routed to an atmospheric distillation system (not shown) along with other distillate products recovered from the gas cooling and purification section (not shown). The atmospheric tower bottoms, such as hydrocarbons having an initial boiling point of at least about 340° C., such as an initial boiling point in the range from about 340° C. to about 427° C., may then be further processed through a vacuum distillation system (not shown) to recover vacuum distillates. One or more distillate products 48 may be recovered from fractionation system 46. The vacuum tower bottoms product 50, such as hydrocarbons having an initial boiling point of at least about 480° C., such as an initial boiling point in the range from about 480° C. to about 565° C., may then be separated via centrifuge 64 and filter 65, or other solids/liquids separation means, to recover spent catalyst solids 66 from unreacted pitch 68. At least some of the unreacted pitch 68 may then be routed back to the pitch hydrocracking reactor 62 together with fresh pitch 10 for continued processing. A small slipstream 110 of recycle pitch stream 68 may be purged from the loop to maintain the material balance and continuity of flow. Spent catalyst solids 66 may be fed to hopper 70 for temporary storage and through flow line 72 for metals reclamation or disposal.

In some embodiments, the recycled unreacted pitch 68, the feed pitch 10, or both, may be cooled and solidified via freeze unit 80. The cooled and solidified pitch 82 may then be fed along with the spent catalyst feed to hopper 56 and/or grinder 60. Following grinding, the ground mixture may be slurried with a liquid hydrocarbon 12, heated, and fed as a catalyst-oil slurry to the bottom of the pitch hydrocarbon reactor 62.

Figure 3:
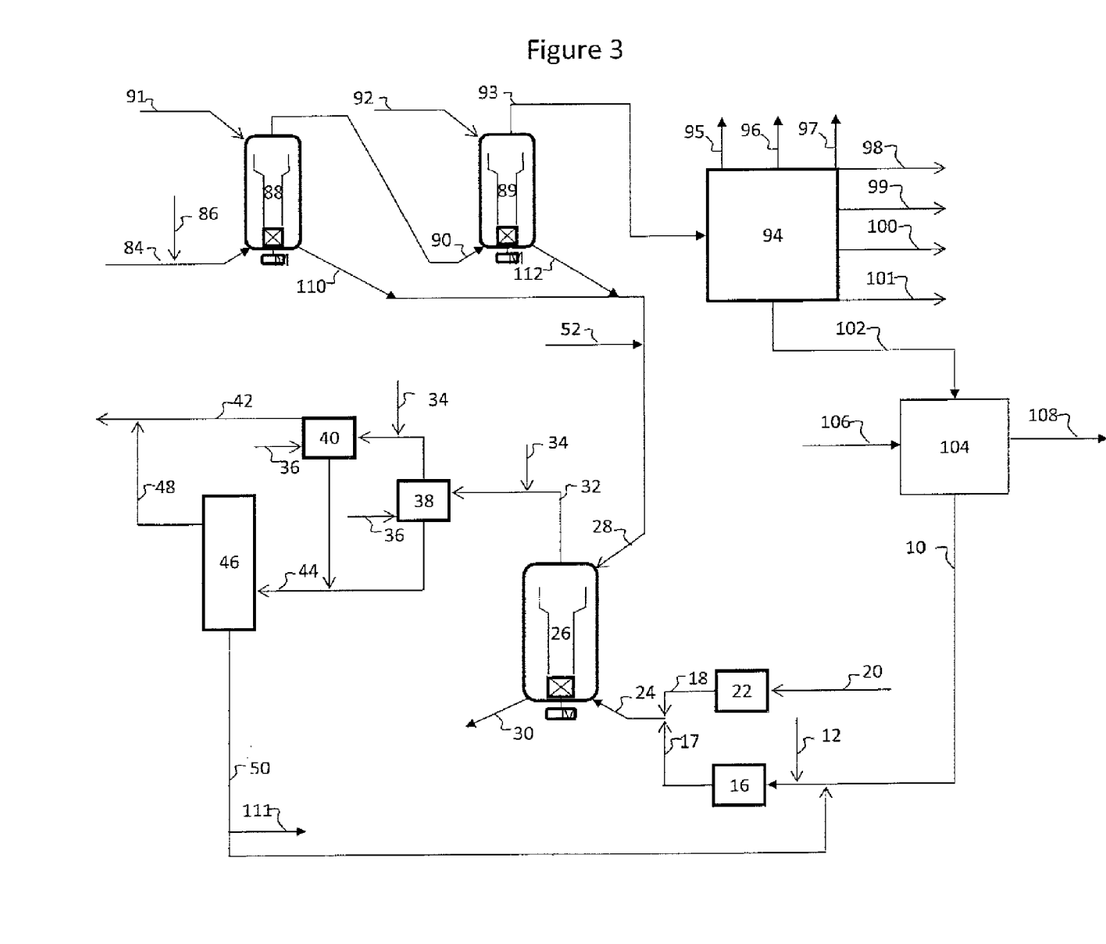

Referring now to FIG. 3, an overall integrated process for upgrading residuum hydrocarbons with very low or negligible pitch byproduct production according to embodiments herein is illustrated, where like numerals represent like parts. Residuum hydrocarbon fraction 84 and hydrogen 86 may fed to a residuum hydrocarbon hydrocracking unit including a first stage ebullated bed reactor 88 and a second stage ebullated bed hydrocracking reactor 89. The hydrocracked product 90 from first stage hydrocracking reactor 88 may be fed to second stage hydrocracking reactor 89. In ebullated bed reactors 88, 89, the hydrocarbons and hydrogen are contacted with hydroconversion catalysts 91, 92, which may be the same or different, to react at least a portion of the pitch with hydrogen to form lighter hydrocarbons, i.e., hydrocracking, and to demetallize the residuum hydrocarbons, remove Conradson Carbon Residue, or otherwise convert the residuum hydrocarbons to useful products.

Target conversions in through the ebullated bed reactor stages 88, 89 may be in the range from about 40 wt % to about 75 wt %, depending upon the feedstock being processed. In any event, target conversions should be maintained below the level where sediment formation becomes excessive and thereby prevents continuity of operations. In addition to converting the residuum hydrocarbons to lighter hydrocarbons, sulfur removal may be in the range from about 40 wt % to about 80 wt %, metals removal may be in the range from about 60 wt % to 85 wt % and Conradson Carbon Residue (CCR) removal may be in the range from about 30 wt % to about 65 wt %.

Following conversion in ebullated bed reactor stages 88, 89, the partially converted hydrocarbons may be recovered via flow line 93 as a mixed vapor/liquid effluent and fed to a fractionation system 94 to recover one or more hydrocarbon fractions. As illustrated, fractionation system 94 may be used to recover an offgas 95, a light naphtha fraction 96, a heavy naphtha fraction 97, a kerosene fraction 98, a diesel fraction 99, a light vacuum gas oil fraction 100, a heavy gas oil fraction 101, and a vacuum residuum fraction 102.

Vacuum resid fraction 102 may be fed to SDA unit 104, where it is contacted with a solvent 106 to produce a deasphalted oil fraction 108 and feed pitch fraction 10. The solvent used in SDA unit 104 may include an aromatic solvent, a mixture of gas oils, a light naphtha, a light paraffin containing 3 to 7 carbon atoms, or a combination of two or more of these solvents. In some embodiments, the solvent includes hydrocarbons derived from one or more of fractions 95, 96, 97, 98, 99, 100, or 101. Feed pitch fraction 10 may then be processed as described above with respect to FIG. 1 or FIG. 2. A small slipstream 111 of recycle pitch stream 50 may be purged from the loop to maintain the material balance and continuity of flow.

Catalysts useful in the first hydrocracking stage 88 and the second hydrocracking stage may include one or more elements selected from Groups 4-12 of the Periodic Table of the Elements. In some embodiments, the catalysts may comprise, consist of, or consist essentially of one or more of nickel, cobalt, tungsten, molybdenum, and combinations thereof, either unsupported or supported on a porous substrate such as silica, alumina, titania, or combinations thereof. As supplied from the manufacturer or as resulting from a regeneration process, the catalysts may be in the form of metal oxides, for example. If necessary or desired, the metal oxides may be converted to metal sulfides prior to or during use. In some embodiments, the hydrocracking catalysts may be pre-sulfided and/or pre-conditioned prior to introduction to the reactor.

Partially spent catalyst may be recovered from the first hydrocracking stage 88 and second hydrocracking stage 89 via flow lines 110, 112, respectively. In some embodiments, partially spent catalyst from only the first hydrocracking stage 88 may be fed to the pitch hydrocracking reactor 26. In other embodiments, partially spent catalyst from only the second hydrocracking stage 89 may be fed to the pitch hydrocracking reactor 26. In other embodiments, a mixture of partially spent catalyst from both the first and second hydrocracking stages 88, 89 may be fed to the pitch hydrocracking system.

In some embodiments, the fresh catalysts fed to stage 88 are different than those fed to stage 89 to take advantage of the higher metals contents and CCR contents of the residuum feed. The differences in these catalysts may include pore volume and pore size distribution differences, surface area differences and metals loading differences. The characteristics of the residuum feed stream 84 and the reaction severity used in stage 88 may impact the selection of properties of the fresh catalyst stream 91 versus that of fresh catalyst stream 92 as well as the extent of how much partially spent catalyst streams 110 and 112, respectively, are fed to the pitch hydrocracking reactor 26.

As illustrated in FIG. 3, the residuum hydrocarbon hydrocracking system (reactor stages 88, 89) and the pitch hydrocracking system 26 include separate effluent processing units. Such may be advantageous where the pitch hydrocracking system may occasionally be shut down, such as for maintenance or during times when the residuum hydrocarbon hydrocracking system is processing feeds that do not produce significant quantities of pitch, as well as for integration of a pitch hydrocracking system into an existing residuum hydrocarbon hydrocracking system.

Embodiments herein also contemplate processing of the reactor effluents 32, 93, the liquid portions thereof, or the vapor portions thereof, in a common fractionation system and/or a common gas cooling, purification, and recycle gas compression system. The common processing may reduce initial unit cost (reduced piece count) and simplify operations (reduced number of process variables/steps).

The integrated hydrocracking systems disclosed herein, such as those illustrated by FIG. 3, utilize a fresh catalyst feed to the residuum hydrocarbon hydrocracking reactors and a partially and/or intermediate spent catalyst feed to the pitch hydrocracking reactors. For ease of process operations, the catalyst feed rates to each unit may be linked. For example, where the fresh catalyst feed to reactor stages 88 and/or 89 are increased, the spent catalyst withdrawal rate necessarily increases. The rate of partially or intermediate spent catalyst feed to the pitch hydrocracking reactors may thus be increased by a similar rate so as to avoid accumulation of spent catalyst.

As noted above, it may be desirable to shut down the pitch hydrocracking unit for various reasons. When operational, the pitch hydrocracking unit provides for additional incremental conversion of residuum hydrocarbons to distillate range products. The additional conversion may be achieved with little or no additional fresh catalyst requirements. For example, embodiments herein may achieve a 5% to 40% incremental increase in residuum hydrocarbon conversion, where the fresh residuum hydrocarbon hydrocracking catalyst feed to reactor stages 88, 89 is incrementally increased by 0% to 35%. In other words, the incremental increase in fresh hydrocracking catalyst feed is equivalent to may be less than about 135% of the catalyst rate when the pitch hydrocracking unit is not utilized.

The integrated hydrocracking systems disclosed herein, such as that illustrated by FIG. 3, may provide for an overall residuum conversion, based on hydrocarbon oil feed, of at least 90 wt % in some embodiments; at least 95 wt % in other embodiments; and at least 98 wt % in yet other embodiments.

As described above, embodiments disclosed herein may provide an integrated process for upgrading residuum hydrocarbons. Advantageously, embodiments herein may significantly reduce or eliminate the production of pitch from the upgrading process, thereby reducing dependency on external units or creating a low or negative-value product, or the need to find an outlet for the low value pitch. Further, embodiments herein provide an increase in residuum hydrocarbon conversion with little or no additional fresh catalyst requirements. For example, residuum conversion limits may be extended from typically achieved conversions of 55% to 75% up to 98 wt %. Embodiments herein also advantageously use residual activity in partially spent catalysts, and may use high temperature hydrocracking conditions, since the corresponding high coke formation rates on the catalysts particles is acceptable in the pitch hydrocracking unit as the fully spent catalyst particles containing coke and metals will be sent for metals reclamation rather than for further catalytic processing.

Embodiments herein may also advantageously result in an overall processing approach requiring reduced reactor volume to achieve a given conversion. Embodiments herein may also reduce unit investment costs by integrating residuum hydrocarbon hydrocracking and pitch hydrocracking into a common gas cooling, purification, and compression loop.

While the disclosure includes a limited number of embodiments, those skilled in the art, having benefit of this disclosure, will appreciate that other embodiments may be devised which do not depart from the scope of the present disclosure. Further, while multiple process schemes are illustrated with varying process steps, embodiments contemplated herein may utilize process steps, such as catalyst grinding or entrained catalyst separations, among others, although not explicitly illustrated and/or described. Accordingly, the scope should be limited only by the attached claims.

What is claimed:

1. A system for upgrading residuum hydrocarbons, the system comprising:
    a residuum hydrocarbon conversion reactor system for contacting a residuum hydrocarbon, hydrogen, and a hydrocracking catalyst to convert at least a portion of the residuum hydrocarbon to distillate range hydrocarbons;
    a separation system for fractionating the distillate range hydrocarbons into two or more hydrocarbon fractions including a vacuum tower bottoms fraction;
    a separation system for recovering at least some of the spent catalyst from the residuum hydrocarbon conversion reactor system;
    a grinder for grinding the recovered spent catalyst;
    a solvent deasphalting unit for solvent deasphalting the vacuum tower bottoms fraction to produce a deasphalted oil fraction and a pitch fraction;
    a pitch hydrocracking reactor system for contacting the pitch, hydrogen, and the ground spent catalyst at reaction conditions or temperature and pressure sufficient to convert at least a portion of the pitch to distillate hydrocarbons and
    a separation system for separating the distillate hydrocarbons from the ground spent catalyst.

2. The system of claim 1, wherein the residuum hydrocarbon conversion reactor system comprises one or more hydrocracking reaction stages comprising an ebullated bed hydrocracking reactor.

3. The system of claim 2, wherein the grinder is configured to receive spent catalyst from a first hydrocracking reaction stage.

4. The system of claim 2, wherein the grinder is configured to receive spent catalyst from a second hydrocracking reaction stage.

5. The system of claim 2, wherein the grinder is configured to receive spent catalyst from both a first and a second hydrocracking reaction stage.

6. The system of claim 1, further comprising a mixer for forming a slurry of the ground catalyst for feeding the ground catalyst as a slurry to the pitch hydrocracking reactor.

7. The system of claim 6, further comprising a freeze unit for cooling and solidifying the vacuum distillation tower bottoms.

8. The system of claim 7, wherein the grinder is configured to grind the spent catalyst and the solidified vacuum distillation tower bottoms to form a ground mixture, and wherein the mixer is configured to slurry the ground mixture in a liquid hydrocarbon.

9. A system for upgrading pitch, the system comprising:
a pitch hydrocracking reactor for contacting pitch, hydrogen, and a ground spent catalyst at reaction conditions of temperature and pressure sufficient to convert at least a portion of the pitch to distillate hydrocarbons;
a separator for separating the distillate hydrocarbons from the ground spent catalyst;
a vacuum distillation tower to fractionate the distillate hydrocarbons to produce one or more hydrocarbon fractions and a vacuum distillation tower bottoms fraction; and
a recycle system for recycling the vacuum distillation tower bottoms fraction to the pitch hydrocracking reactor.

10. The system of claim 9, further comprising an ebullated bed hydrocracking reactor for hydrocracking a heavy oil feedstock with a catalyst.

11. The system of claim 10, further comprising a separator for recovering the spent catalyst from the ebullated bed hydrocracking reactor.

12. The system of claim 11, further comprising a grinder for grinding the spent catalyst recovered from the ebullated bed hydrocracking reactor.

13. A system for upgrading residuum hydrocarbons, the system comprising:
a hydrocracking reaction system comprising one or more hydrocracking reaction stages comprising an ebullated bed hydrocracking reactor for contacting a heavy oil feedstock, hydrogen, and a hydrocracking catalyst;
a separation system for recovering spent catalyst from the ebullated bed hydrocracking reactor;
a grinder for grinding the recovered spent catalyst;
a pitch hydrocracking reactor system for contacting pitch, hydrogen, and the ground spent catalyst at reaction conditions of temperature and pressure sufficient to convert at least a portion of the pitch to distillate hydrocarbons; and
a separation system for separating the distillate hydrocarbons from the ground spent catalyst.

14. The system of claim 13, wherein the pitch hydrocracking reactor system comprises an ebullated bed pitch hydrocracking reactor.

15. The system of claim 14, wherein the ebullated bed pitch hydrocracking reactor is configured to receive the ground spent catalyst proximate a top of the ebullated bed pitch hydrocracking reactor and to discharge fully spent catalyst proximate a bottom of the ebullated bed pitch hydrocracking reactor.

16. The system of claim 13, further comprising a metals reclamation system for reclaiming metals from the fully spent catalyst.

17. The system of claim 13, wherein the ebullated bed pitch hydrocracking reactor is configured to receive a slurry of the ground spent catalyst proximate a bottom of the ebullated bed pitch hydrocracking reactor.

18. The system of claim 13, wherein the pitch hydrocracking reactor system is a single pass upflow reactor.

19. The system of claim 13, further comprising a quench system for quenching a hydrocarbon effluent from the pitch hydrocracking reactor system.

20. A system for upgrading residuum hydrocarbons, the system comprising: a residuum hydrocarbon conversion reactor system for contacting a residuum hydrocarbon, hydrogen, and a hydrocracking catalyst to convert at least a portion of the residuum hydrocarbon to distillate range hydrocarbons; a separation system for fractionating the distillate range hydrocarbons into two or more hydrocarbon fractions including a vacuum tower bottoms fraction; a separation system for recovering at least some of the spent catalyst from the residuum hydrocarbon conversion reactor system; a grinder for grinding the recovered spent catalyst; a solvent deasphalting unit for solvent deasphalting the vacuum tower bottoms fraction to produce a deasphalted oil fraction and a pitch fraction; a pitch hydrocracking reactor system for contacting the pitch, hydrogen, and the ground spent catalyst at reaction conditions of temperature and pressure sufficient to convert at least a portion of the pitch to distillate hydrocarbons; and a mixer for forming a slurry of the ground spent catalyst for feeding the ground spent catalyst as a slurry to the pitch hydrocracking reactor.

21. The system of claim 20, further comprising a freeze unit for cooling and solidifying the vacuum distillation tower bottoms.

22. The system of claim 21, wherein the grinder is configured to grind the spent catalyst and the solidified vacuum distillation tower bottoms to form a ground mixture, and wherein the mixer is configured to slurry the ground mixture in a liquid hydrocarbon.

\* \* \* \* \*